Jan. 12, 1943.  G. B. HOGABOOM, JR  2,308,241
INDIVIDUAL SERVICE TEA BAG
Filed May 7, 1941　　2 Sheets-Sheet 1
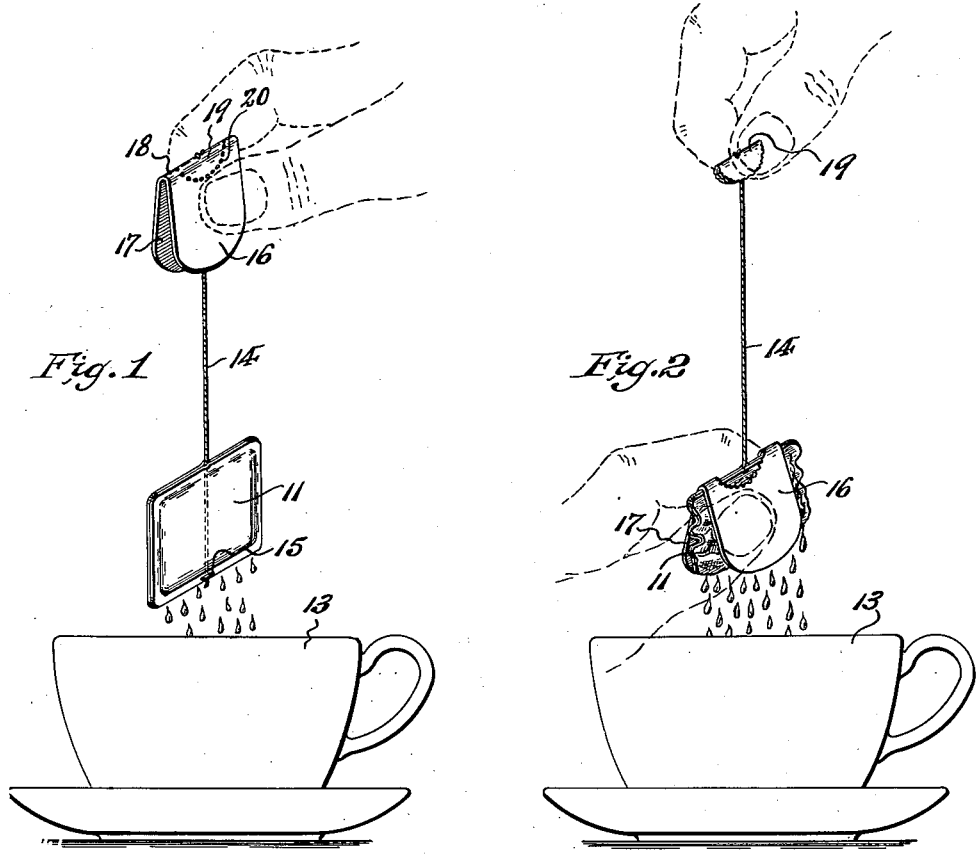
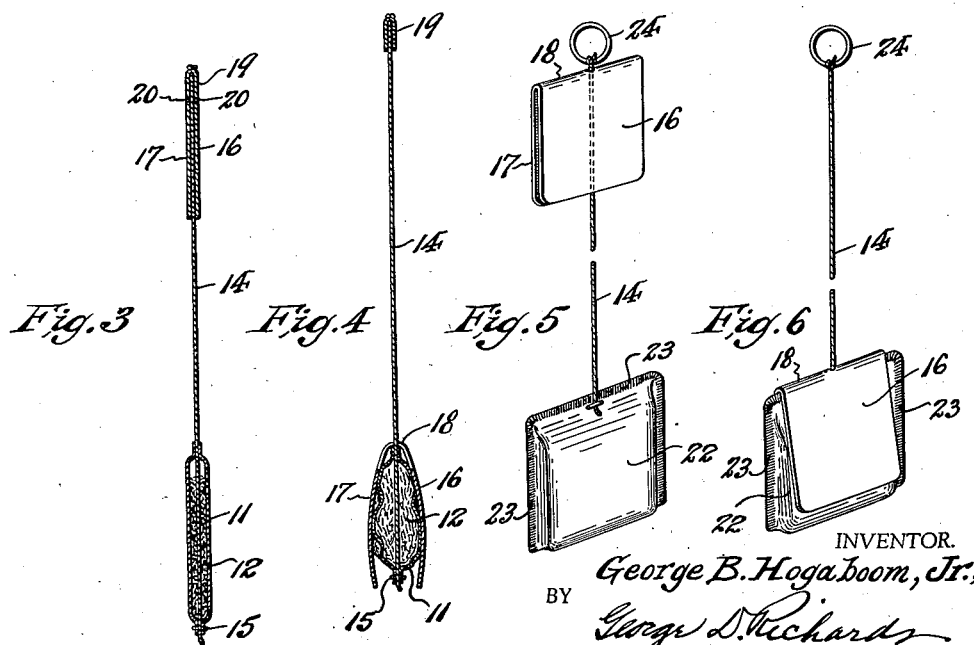
INVENTOR.
George B. Hogaboom, Jr.,
BY
George D. Richards
ATTORNEY.

Jan. 12, 1943.　　G. B. HOGABOOM, JR　　2,308,241
INDIVIDUAL SERVICE TEA BAG
Filed May 7, 1941　　2 Sheets-Sheet 2

INVENTOR.
George B. Hogaboom, Jr.,
BY
George D. Richards
ATTORNEY.

Patented Jan. 12, 1943

2,308,241

UNITED STATES PATENT OFFICE 2,308,241

INDIVIDUAL SERVICE TEA BAG

George B. Hogaboom, Jr., Newark, N. J.

Application May 7, 1941, Serial No. 392,266

6 Claims. (Cl. 99—77.1)

This invention relates to improvements in individual service tea bags which enclose, in a liquid pervious bag or envelope having suspending means, a quantity of tea leaves sufficient to produce by infusion, when dipped in a cup of hot water, an individual service of tea beverage.

Individual service tea bags have come into increasing use, not only in restaurants and at refreshment stands, but also in the home. In the common forms of tea bags heretofore in use, certain disadvantages are involved in that, after a bag has been dipped into a cup of hot water and held therein for a sufficient time to obtain an infusion of desired strength to suit the user's taste, the same must be withdrawn and laid aside. Owing to the dripping condition of the used bag there is risk that the drip therefrom will fall upon the user's apparel or upon the table linen. Even when care is taken to avoid this and the removed bag is laid beside the cup in the saucer, which is the common practice, the retained liquid will drain therefrom into the saucer, so as to wet the cup bottom, with risk, when the cup is lifted to the user's mouth, that drip therefrom will fall upon and stain the user's apparel or the table linen.

It is an object of this invention to provide a tea bag which will obviate the disadvantages above referred to; and to this end, this invention provides a novel tea bag structure having suspending means including manipulatable means by which the bag, when removed from a cup in dripping condition, may be engaged and squeezed to sufficiently expel the contained liquid therefrom as to eliminate dripping and draining, whereby the same may be moved about without dripping, and laid in the saucer of a cup or elsewhere deposited without risk of draining off liquid into the saucer or other depository.

Other objects of this invention, not at this time more particularly enumerated, will be understood from the following detailed description of the same.

Illustrative embodiments of this invention are shown in the accompanying drawings, in which:

Fig. 1 shows a tea bag according to this invention as suspended and lifted out of a cup in which it has been immersed; Fig. 2 shows the application of the manipulatable means, with which the tea bag structure is provided, to the tea bag for squeezing the same to expel liquid therefrom so as to obtain a non-dripping and non-draining condition thereof; Fig. 3 is a longitudinal sectional view, somewhat enlarged, of the form and condition of tea bag as shown in Fig. 1; and Fig. 4 is a longitudinal sectional view, somewhat enlarged, of the form and condition of tea bag as shown in Fig. 2.

Fig. 5 shows a modified form and construction of tea bag according to this invention; and Fig. 6 is a view thereof showing the application of the manipulatable means to the bag for expelling liquid therefrom.

Similar characters of reference are employed in the above described views, to indicate corresponding parts.

Figure 7:
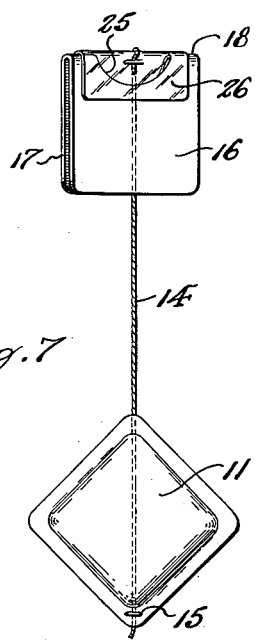
Figs. 7 and 8 are respectively views of other modified forms of tea bag structures embodying the principles of this invention.

Referring to Figs. 1 to 4 inclusive, the embodiment of the novel tea bag structure according to this invention as therein shown comprises, a bag or envelope-like container 11, the interior of which is charged with a quantity of tea leaves 12 sufficient to provide an individual service of tea beverage when infused in a cup 13 containing hot water. Connected with said container 11 is a flexible cord 14 by which the same may be held suspended for dipping into the cup of hot water. The container 11 may be variously formed and may be made of any suitable selected liquid pervious material. For example, the container may be in the form of an envelope made of pervious paper, such as filter paper. The flexible cord 14 is preferably arranged to extend through the interior of the container 11, with its lower end suitably anchored to the lower end portion of the container body, as by a fastening staple 15, or by any other suitable fastening arrangement. Connected with the upper end of the cord 14 is a combined finger-piece and manipulatable means for application to the container after wetting thereof, to expel liquid therefrom. This means, in one form thereof, comprises a body of liquid impervious sheet material, such e. g. as waterproof paper, folded transversely to provide a pair of superposed face sections 16 and 17 dependent from the medial fold portion 18 thereof. Provided in and so as to intersect the fold portion 18 is a tear-out section 19 which is initially defined by a bounding line of rouletted perforations 20. The upper end of said cord 14 is affixed to the tear-out section 19 in any suitable manner, or by any suitable fastening means.

In the use of the tea bag structure, the body

16—17—18 is grasped between the user's fingers so as to suspend the container 11 therefrom by the cord 14, whereupon the container and its tea-leaf content may be lowered into a cup of hot water to produce the infusion which converts the water into the desired tea beverage, upon accomplishment of which the dripping container is lifted clear of the cup content, as shown in Fig. 1. This having been done, the user tears away from the body 16—17—18, the tear-out section 19 to which the upper end of the cord 14 is attached, and which still serves as a finger-piece for holding by one hand the container as suspended by the cord 14. By thus detaching the tear-out section 19 the body 16—17—18 is freed so that the user may grasp the face sections 16—17 between the fingers of the other hand, and thereupon relatively move the container and body so that the former is drawn between and into the embrace of the opposed face sections 16—17. By reason of the fact that the suspension cord 14 passes through the container 11 so as to be anchored to its bottom end portion, when an upward pull is exerted upon said cord it will not only hold the container 11 between the body face sections 16 and 17, but will also tend to contract said container so as to more or less compact the same between and substantially within the bounds of said body face sections 16 and 17. When the dripping container has thus been embraced by and between the body face sections 16—17, the user may squeeze the assembly between the fingers, as shown in Fig. 2, thereby to expel from the container and its tea leaf content a sufficient quantity of the contained liquid as will thereafter eliminate dripping or draining of liquid therefrom, and consequently the tea bag structure may be moved about and deposited in the saucer of the cup or elsewhere in a substantially dripless and nondraining condition.

Figure 8:
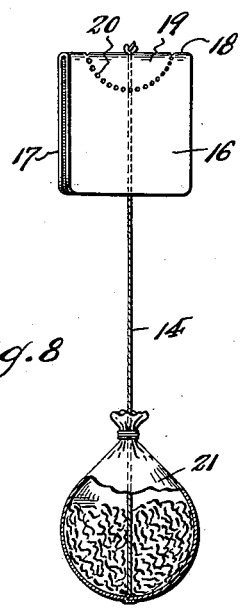

It will be obvious that the various elements of the tea bag structure according to this invention are subject to more or less modification as to form, materials of which they are made, and associated relations. For example, as shown in Fig. 8, the tea container per se, may be in the form of a cloth bag 21 rather than in that of a paper envelope as already above mentioned; or, as shown in Figs. 5 and 6, the tea container may be in the form of a bag or pouch 22, made either of paper or cloth folded upon itself and its meeting marginal portions secured together by stitching 23. Furthermore, as also shown in Figs. 5 and 6, the container suspending cord 14 may be anchored or fastened to the upper end of the same instead of to the lower end as already described; and the body 16—17—18 may be threaded upon said cord 14, so as to slide down thereon into container embracing relation when its use for squeezing out the used container is desired. In the latter case, the tear-out section 19 is omitted, and a separate finger-piece, such as the ring 24, may be suitably fastened to the upper end of said suspending cord 14.

A further modification of the body 16—17—18 is shown in Fig. 7, wherein the fold portion 18 is provided with a cut-out opening 25, which is initially covered with an adhered layer 26 of comparatively thin and easily torn away paper or the like, to which the upper end of the suspending cord is suitably secured, and which may be easily torn away to free the body 16—17—18 for movement relative to the container 11, so as to receive the latter for liquid expelling manipulation.

Figure 9:
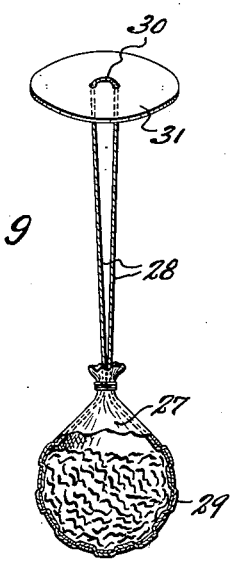
Fig. 9 shows another modified form and construction of tea bag within the scope of this invention.
Figure 10:
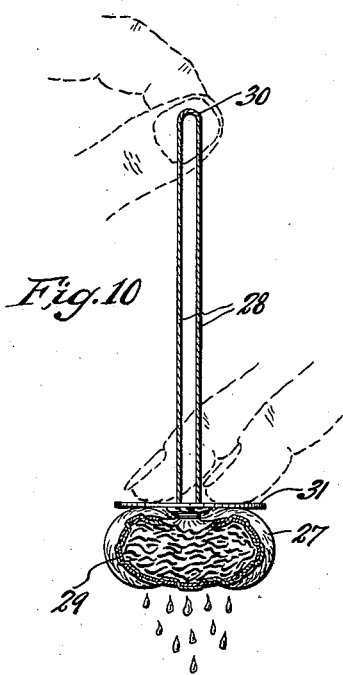
Fig. 10 is a view thereof showing its manipulation for expelling liquid therefrom.

In Figs. 9 and 10 there is shown a somewhat different arrangement for applying liquid expelling pressure to a saturated tea bag, which is, however, within the broad principles of this invention. In this arrangement the tea leaf container 27 is in the form of a bag, preferably made of cloth, and suspending cord 28 is associated therewith so as to provide a draw-string portion or loop 29 interwoven through and around the container material, with the free end portions of said cord extending freely upward therefrom in parallel so as to form a top loop 30. Threaded slidably onto the parallel free portions of the cord 28, between the container 27 and the top loop 30 is a pressure disc 31. Initially said disc 31 is disposed in stopped relation against the top loop 30 of the cord (see Fig. 9), in which position said disc serves as a finger-piece for manipulating the suspended container during dipping thereof into a cup of hot water to produce the desired tea infusion. Upon removing the saturated container 27 from the cup, the top loop end 30 of the cord 28 is grasped by the fingers of one hand, and the cord is drawn upwardly through the disc 31, as backed and supported by the fingers of the other hand, until the container 27 abuts the underside of the disc 31. Continued pull upon the cord 28 under such conditions, not only presses the container 27 against the disc 31, but also constricts the draw-string portion or loop 29 about the container with added squeezing effect, all whereby the liquid, contained in the saturated container and its content, is expelled so as to render the container substantially non-dripping and non-draining during subsequent moving about and deposit of the same in the saucer of a cup or elsewhere.

I am aware that various other changes, in addition to those already mentioned, could be made in the above described constructions, and that widely different embodiments of this invention could be made without departing from the scope thereof as defined in the following claims. It is therefore intended that all matter contained in the foregoing description or shown in the accompanying drawings shall be interpreted as illustrative and not in a limiting sense.

I claim:

1. The herein described article of manufacture for the purposes set forth including an absorbent compressible element, an attenuated lifting element attached to the first-named element, and a hood including a pair of leaves hinged together and extending from their hinge toward said compressible element, said hood being penetrated approximately at the hinge by and slidable on the lifting element toward and from the compressible element.

2. The herein described article of manufacture for the purposes set forth including an absorbent compressible element, an attenuated lifting element attached to said absorbent element, a hood downwardly open toward said compressible element, said hood including mutually connected opposed sides adapted to be moved toward and from one another, said hood being penetrated at a point approximately in the line of connection between its sides by and slidable on the lifting element toward and from the compressible element.

3. The herein described article of manufacture comprising a compressible tea bag, a suspension cord attached to said tea bag, and a hood including a pair of leaves hinged together and extending from their hinge toward said tea bag, said hood being penetrated approximately at the hinge by and slidable on said suspension cord toward and so as to embrace said tea bag after wetting of the latter, and then subject to manipulation for applying squeezing pressure to the wet tea bag to expel liquid therefrom.

4. The herein described article of manufacture for the purposes set forth including an absorbent compressible element, an attenuated lifting element attached by its lower end to said absorbent element, a hood downwardly open toward said compressible element, said hood including mutually connected opposed sides adapted to be moved toward and from one another, and said hood including separable means intersecting the connection between its sides and to which the upper end of said lifting element is attached, said hood, when said separable means is detached therefrom, being penetrated by and slidable on the lifting element toward and from the compressible element.

5. The herein described article of manufacture for the purposes set forth including an absorbent compressible element, an attenuated lifting element attached by its lower end to said absorbent element, a hood including a pair of leaves hinged together and extending from their hinge toward said compressible element, and said leaves including separable means intersecting their hinge to which the upper end of said lifting element is attached, said hood, when said separable means is detached therefrom, being penetrated by and slidable on the lifting element toward and from the compressible element.

6. The herein described article of manufacture comprising a compressible tea bag, a suspension cord attached by its lower end to said tea bag, a hood including a pair of leaves hinged together and extending from their hinge toward the tea bag, and said leaves including a separable section intersecting their hinge to which the upper end of said suspension cord is attached, said hood, when said separable means is detached therefrom, being penetrated by and slidable on said suspension cord toward and so as to embrace said tea bag after wetting of the latter, and then subject to manipulation for applying squeezing pressure to the wet tea bag to expel liquid therefrom.

GEORGE B. HOGABOOM, Jr.